United States Patent
Becerra et al.

(10) Patent No.: US 9,811,561 B2
(45) Date of Patent: *Nov. 7, 2017

(54) EXECUTING DATABASE QUERIES USING MULTIPLE PROCESSORS

(71) Applicant: SAP SE, Walldorf (DE)

(72) Inventors: Santiago Becerra, Del Mar, CA (US); Santiago E. Becerra, Del Mar, CA (US); Alex C. Schaefer, Solana Beach, CA (US); John McInerney, La Mesa, CA (US); Patrick Cheng, San Diego, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,007

(22) Filed: Nov. 4, 2015

(65) Prior Publication Data
US 2016/0055206 A1 Feb. 25, 2016

Related U.S. Application Data

(63) Continuation of application No. 14/288,237, filed on May 27, 2014, now Pat. No. 9,189,519, which is a continuation of application No. 13/835,795, filed on Mar. 15, 2013, now Pat. No. 8,762,366.

(60) Provisional application No. 61/762,782, filed on Feb. 8, 2013.

(51) Int. Cl.
*G06F 7/00* (2006.01)
*G06F 17/30* (2006.01)
*G06F 9/38* (2006.01)

(52) U.S. Cl.
CPC ...... *G06F 17/30454* (2013.01); *G06F 9/3887* (2013.01); *G06F 17/30442* (2013.01); *G06F 17/30463* (2013.01); *G06F 17/30483* (2013.01)

(58) Field of Classification Search
CPC .................. G06F 17/30445; G06F 9/45533
USPC .......................................................... 707/713
See application file for complete search history.

(56) References Cited

U.S. PATENT DOCUMENTS

| | | | | |
|---|---|---|---|---|
| 5,805,795 A * | 9/1998 | Whitten | ............ | G06F 11/3672 714/32 |
| 7,996,386 B2 * | 8/2011 | Day | .................. | G06F 17/30312 707/713 |
| 2002/0010706 A1 * | 1/2002 | Brickell | ............ | G06F 17/30312 |
| 2004/0019770 A1 * | 1/2004 | Kawahito | ............ | G06F 8/4441 712/227 |

(Continued)

*Primary Examiner* — Binh V Ho

(57) ABSTRACT

A system and a method are disclosed for efficiently executing database queries using a computing device that includes a central processing unit (CPU) and a processing unit based on single instruction multiple thread (SIMT) architecture, for example, a GPU. A query engine determines a target processing unit to execute a database query based on factors including the type and amount of data processed by the query, the complexity of the query, and the current load on the processing units. An intermediate executable representation generator generates an intermediate executable representation for executing a query on a database virtual machine. If the query engine determines that the database query should be executed on an SIMT based processing unit, a native code generator generates native code from the intermediate executable representation. The native code is optimized for execution using a particular processing unit.

20 Claims, 6 Drawing Sheets

(56) References Cited

U.S. PATENT DOCUMENTS

| | | | |
|---|---|---|---|
| 2009/0083521 A1* | 3/2009 | Sato | G06F 21/14 |
| | | | 712/220 |
| 2009/0132488 A1* | 5/2009 | Wehrmeister | G06F 17/30545 |
| 2010/0191720 A1* | 7/2010 | Al-Omari | G06F 17/30463 |
| | | | 707/718 |
| 2011/0040744 A1* | 2/2011 | Haas | G06F 17/30445 |
| | | | 707/713 |
| 2011/0310107 A1* | 12/2011 | Shiraki | G06T 1/20 |
| | | | 345/502 |
| 2013/0083848 A1* | 4/2013 | Joch | H04N 19/40 |
| | | | 375/240.12 |
| 2013/0107289 A1* | 5/2013 | Brodzinski | G06K 15/1836 |
| | | | 358/1.9 |
| 2013/0117305 A1* | 5/2013 | Varakin | G06F 9/5072 |
| | | | 707/769 |
| 2013/0198325 A1* | 8/2013 | Bourges-Sevenier | G06F 9/5016 |
| | | | 709/217 |

* cited by examiner

EXECUTING DATABASE QUERIES USING MULTIPLE PROCESSORS

CROSS-REFERENCE TO RELATED APPLICATION

This application is a continuation of U.S. patent application Ser. No. 14/288,237, filed on May 27, 2014, which is a continuation of U.S. patent application Ser. No. 13/835,795, filed on Mar. 15, 2013, now issued as U.S. Pat. No. 8,762,366, which claims the benefit of U.S. Provisional Application No. 61/762,782, filed on Feb. 8, 2013, each of which is incorporated herein by reference in its entirety.

BACKGROUND

Field of Art

The disclosure generally relates to efficiently executing database queries using a computing device with multiple processors.

Description of the Related Art

Computing devices use graphical processing units (GPUs) for performing graphical computations such as vertex rotation and translation, texture mapping, polygon rendering, and so on. A GPU comprises multiple processors that are efficient at executing highly parallel tasks. Computing devices typically include a GPU in addition to the central processing unit (CPU). GPUs are typically more efficient than general-purpose CPUs for highly parallel tasks.

GPUs are increasingly being used for general purpose processing. However, GPUs are not efficient in performing several types of general purpose computing tasks. For example, GPUs perform tasks efficiently if all tasks are performing identical processing on different parts of the data. In contrast, general purpose computing often requires different processing on different parts of a data set. This causes various tasks of the GPU to synchronize with each other often while performing general purpose computing. Synchronizing tasks of a GPU is an expensive process. Furthermore, not all general purpose computations are amenable to a highly parallel execution. Due to these differences between general purpose computations and typical graphical computations, attempts at performing general purpose tasks using GPUs have met with challenges. Execution of database queries is one such general purpose task that is challenging to execute efficiently on a GPU.

SUMMARY

Described embodiments allow efficient execution of database queries on a computing device having multiple processing units, for example, a central processing unit (CPU) and a processing unit based on a single instruction multiple thread (SIMT) architecture such as a graphical processing unit (GPU). The computing device may be a mobile device with a CPU coupled with a GPU or a mobile device with a CPU having access to multiple GPUs. The database system receives a database query for execution and generates an intermediate executable representation for executing the query using a database virtual machine. The database system determines a target processing unit for executing the database query based on factors including the size of the data input to the database query. For example, if the size of the data processed by the database query is above a threshold value, the database system may process the database query using a GPU. On the other hand, if the size of data processed is small enough to be below the threshold value, the database system may process the database query using the CPU instead of a GPU. If the database system selects the GPU as the target processing unit, the database system generates native code from the intermediate executable representation, compiles the native code to generate executable code, and executes the executable code using the GPU. The native code generated by the database system is optimized for execution on the GPU or multiple GPUs. If the database system selects the CPU for executing the query, the database system may directly execute the intermediate executable representation using the database virtual machine. The database system may compile the intermediate executable representation generated to native code and execute the generated code on the CPU. The database system returns the results of execution of the query or to the designated callback for the database query.

The database system may select a target processing unit for executing a database query based on other factors, for example, the complexity of the query and the current load on the GPU and/or the CPU. In an embodiment the database system introduces dummy instructions, for example, a no-op instruction to ensure that two branches of a conditional statement take the same time for execution. For example, the database system may identify a conditional branch statement in which the execution of instructions on one branch takes more instructions compared to the other branch of the code. The database system introduces one or more dummy instructions in the branch of code that is expected to finish early, to ensure that both branches take the same time for execution. In an embodiment, the database system stores data in a piecewise-columnar fashion.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Due to the popularity of mobile devices more and more tasks that were previously performed by either servers or desktop computers are being performed using mobile devices. For example, conventional applications on mobile devices typically send a request to a remote server for performing computation intensive operations and receive results for displaying. Sending results over a network and receiving results can make the overall operation slow. For example, an interactive application that allows a user to view a report by performing various operations, for example, slicing and dicing, grouping data by a column, pivoting a data set, and so on, may have to send frequent requests to the remote server.

Figure 1:
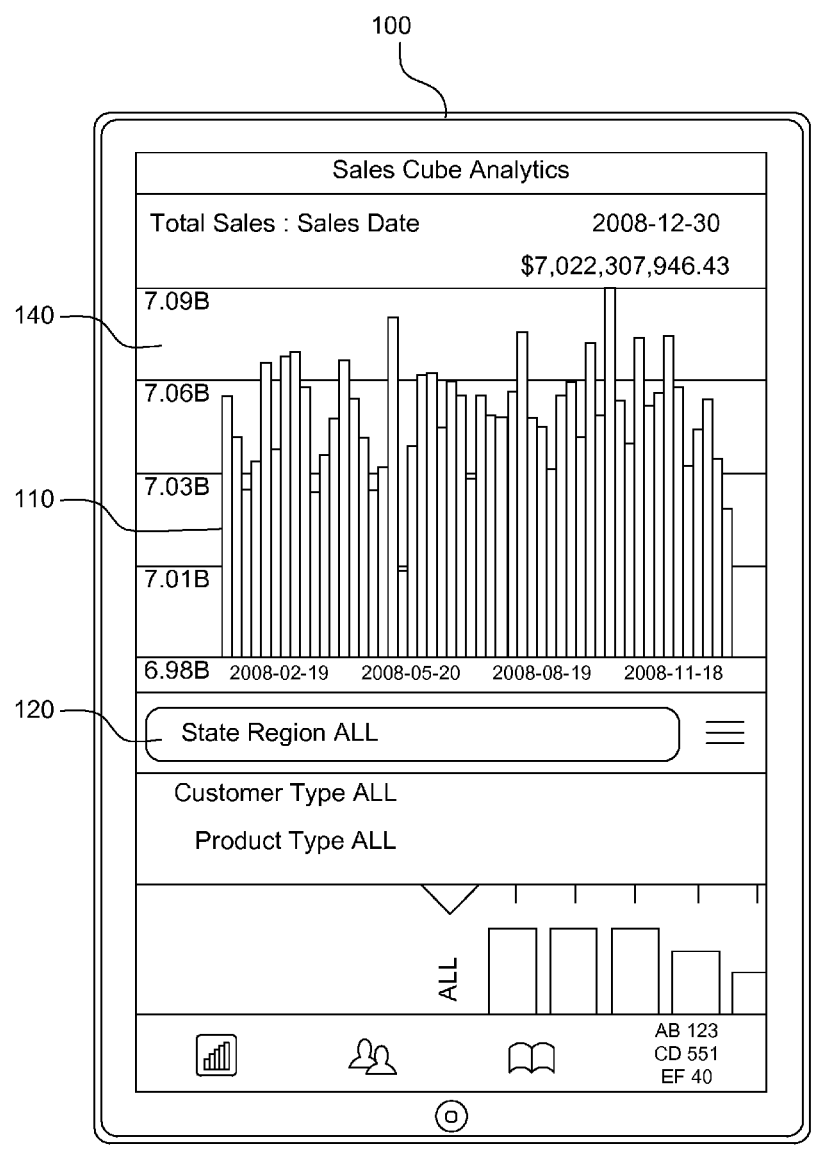
FIG. 1 shows an application displaying visualization of a report on a mobile device, in accordance with an embodiment of the invention.

For example, FIG. 1 shows a user interface 140 of an application displaying a report on a computing device 100, in accordance with an embodiment of the invention. The user interface 140 of the application displays data values and charts 110 based on report data on the screen of a computing device 100. The user interface 140 of the application displayed in FIG. 1 allows the user to manipulate the presentation of the report data, for example, by filtering the data based on certain criteria. The application provides user interface elements 120 for allowing a user to provide input. The application may also display information describing the data presented, for example, mean, median, or standard deviation. As the user interactively changes the data set displayed on the screen, analytic queries are sent by the application to a database system for processing data sets used by the application.

Conventional mobile devices typically send analytic queries to a database server over the network. If there is network delay involved, there may be delay in obtaining results from the database server even if the database server is powerful. This provides a poor interactive experience for the user. To improve the performance of such queries, embodiments execute database queries locally on the mobile device. However, a CPU of a mobile device is typically less powerful than a server used for processing database queries. Therefore, embodiments use the GPU available on the mobile device for processing the database queries. The advantage of a GPU is further extended by having a columnar database. This is so because the columnar database stores elements of column together instead of the entire rows for each element of the column. This minimizes the amount of data needed to be transferred to the GPU for processing.

GPUs are better than conventional CPUs at performing computations having certain characteristics. To execute efficiently on a GPU, the data should be decomposable into smaller parts and the computation should be decomposable into smaller steps. Since GPUs are typically able to perform context-switching faster than CPUs, tasks that require frequent context switching are better suited to GPUs than to CPUs. Furthermore, the applications have to be able to scale better when executed using large numbers of processors to be able to perform better on GPUs as compared to CPUs. However, a CPU may be better at performing certain computations compared to a GPU, for example, if a computation is not suitable for highly parallel processing or if the parallel tasks of a computation execute instructions that are different from each other or require frequent synchronizations.

Figure 2:
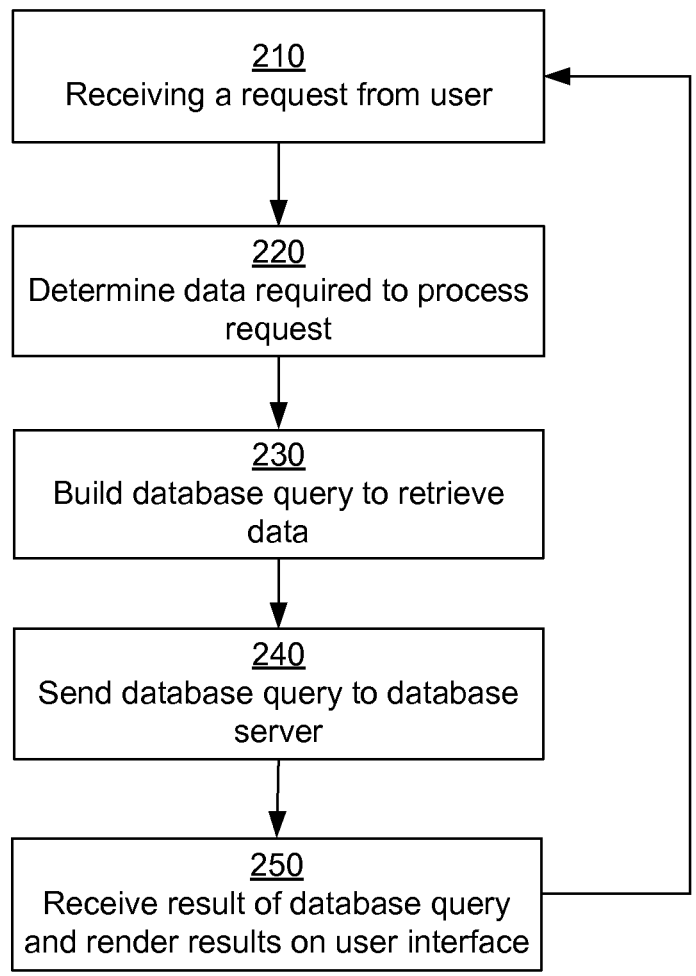
FIG. 2 shows a flowchart illustrating execution of database queries by an application, in accordance with an embodiment of the invention.

Embodiments allow efficient execution of database operations on computing devices having a multiple processing units, for example, a GPU, multiple core CPU, and the like. FIG. 2 shows a flowchart illustrating execution of database queries by an application, for example, the application illustrated in FIG. 1, in accordance with an embodiment of the invention. The computing device 100 receives 210 a request from the user. The user may send a request for example, by providing input using the application. For example, the user may request sales data for a specific state or the sales data for specific time range or may request the application display data in a different manner, for example, by sorting or grouping the data using certain key attributes.

The application determines 220 the data required for processing the request based on a user input. The user request may be expressed by clicking on a button or providing certain text input. The application builds 230 a database query to retrieve the data requested by the application. The application sends 240 the database query to a database system for execution.

The database system executes the queries and sends the results back. The application receives 250 the results of the query and renders appropriate user interface to display the results. For example, the application may render a new chart 110 based on the results received. This process may be repeated for every request received from the user. The process illustrated in FIG. 2 describes how applications running on the computing device 100 access data from databases. The performance of the application depends on the speed with which the application receives data from the database query. The performance of the query may depend on network delay if the database system is remote. Embodiments use a database system executing locally on the computing device. However, for a database system executing locally, the performance depends on how powerful the computing device is. Embodiments use the power of available processing units on the computing device, for example, CPUs and GPUs to execute database queries efficiently.

Figure 3:
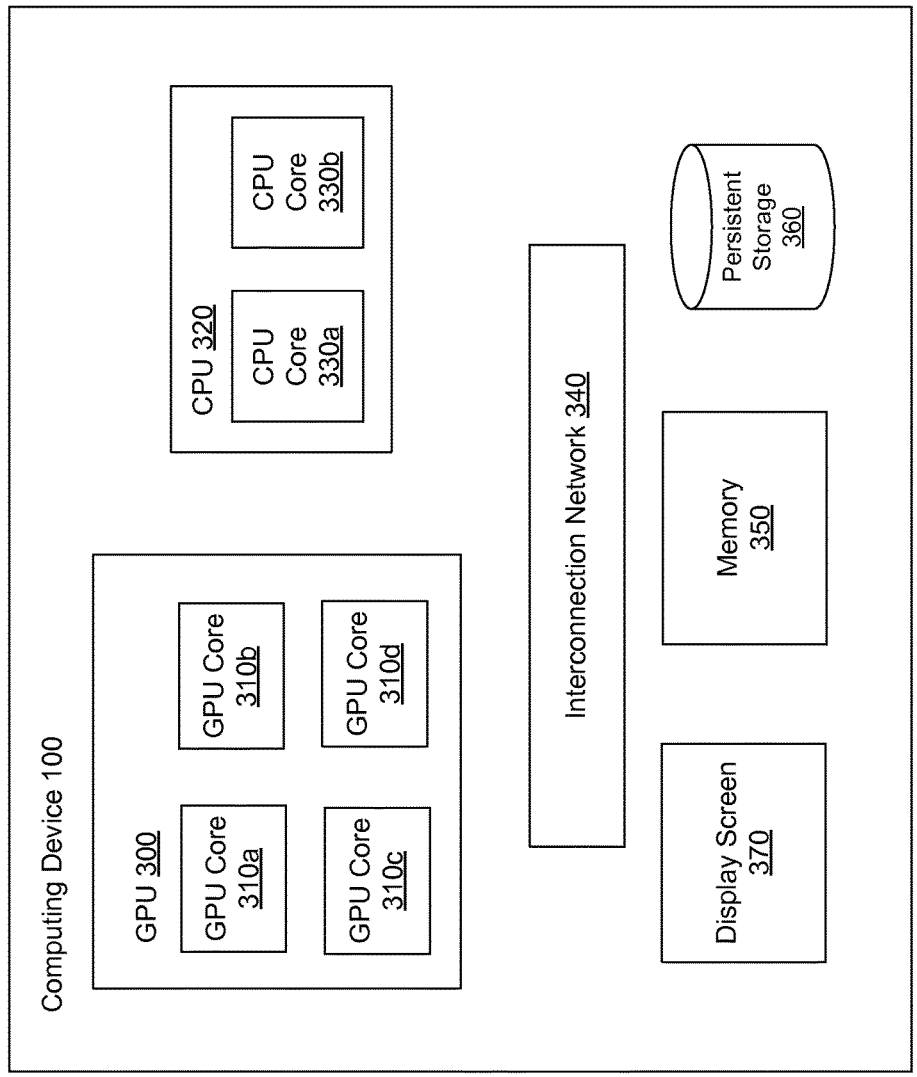
FIG. 3 is a block diagram of the hardware architecture of a computing device, for example, a mobile device with a GPU.

FIG. 3 is a block diagram of the hardware architecture of a computing device, for example, a mobile device with one or more CPUs and GPUs. In one embodiment, the computing device 100 can be a conventional computer system executing, for example, a Microsoft Windows-compatible operating system (OS), Apple OS X, and/or a Linux distribution. In another embodiment, computing device 100 can be a device having computer functionality, such as a personal digital assistant (PDA), mobile telephone, video game system, etc. The description herein refers to processing using a GPU. However, the concepts described herein can be applied to any processor or processors based on a SIMT (single instruction multiple thread) architecture or a SIMD (single instruction multiple data) architecture instead of a GPU.

FIG. 3 and the other figures use like reference numerals to identify like elements. A letter after a reference numeral, such as "310a," indicates that the text refers specifically to the element having that particular reference numeral. A reference numeral in the text without a following letter, such as "310," refers to any or all of the elements in the figures bearing that reference numeral (e.g. "310" in the text refers to reference numerals "310a" and/or "310b" in the figures).

As illustrated in FIG. 3, the computing device 100 includes memory 350, a display screen 370, persistent storage component 360, a GPU 300, a CPU 320, and an interconnection network 340. Other computing devices may include different and/or more components. The computing device may also include various components not shown in FIG. 3, for example, peripheral devices, ports for interacting with other devices, and so on. One or more components shown in FIG. 3 may be on a single chip or on different IC (integrated circuit) chips. For example, the memory 350 and CPU 320 may be on the same IC chip and the GPU on another IC chip or all three components memory 350, CPU 320, and GPU may be on the same IC chip. The computing device 100 may include one or more CPUs and one or more GPUs.

The CPU 320 may be a multi-core processor. Each CPU core 330 is a processing unit that can read and execute instructions. Examples of multi-core processors include dual-core processors with two cores, quad-core processors with four cores, hexa-core processors with six cores, or octa-core processors with eight cores. However, CPUs with tens or even hundreds of cores have been made available by vendors. A multi-core CPU may have on-chip memory that is shared by different cores. The different cores of a CPU may all use the same design in a homogeneous architecture but can also use a mixture of different designs in a heterogeneous architecture.

The GPU 300 is a graphical processing unit. A GPU is a massively parallel piece of hardware which comprises several GPU cores 310. GPUs may be considered an implementation of single instruction multiple data (SIMD) architecture. The GPU cores 310 are also called streaming processors. GPU cores can execute a large number of threads. If a thread starts executing an operation that has long latency, the GPU core 310 puts that thread to sleep, thereby allowing other threads to continue working. GPUs cores are designed to perform multi-threading very efficiently. GPUs are also considered single instruction multiple thread (SIMT) architectures. In other embodiments the computing device 100 may include any processing unit based on an SIMT architecture or an SIMD architecture instead of a GPU.

GPUs are not efficient at handling branches in code. For example, if there is a branch in the code, some of the threads may start executing one side of the branch whereas the other set of threads may start executing the other side of the branch of code. This results in an inefficient execution of the code. Similarly the efficiency of a GPU is low if the code requires threads to interact with each other and/or the code requires synchronization between threads. Accordingly, GPUs perform efficiently if the code requires a very large number of threads performing identical computation without branches or synchronization. However, CPUs may perform better compared to GPUs if the computation is irregular and requires branches in code and interaction or synchronization of threads. Typically units of work performed by CPUs are larger than units of work performed by GPUs for an efficient execution.

The display screen 370 allows users to view information, for example, report data as shown in FIG. 1. The display screen may be a touch screen that allows a user to provide user input also. A GPU may be used to support graphics displayed on the display screen. However, in general GPUs are being used for more general purpose programming rather than specifically for graphics computations. The computing device also has persistent storage component 360 that allows data to be stored in a persistent manner and memory 350 for fast access to data. The interconnection network 340 allows the various processors, for example, CPU cores or GPU cores to interact with each other or with the memory 350. The interconnection network 340 may be implemented as a crossbar switch.

Figure 4:
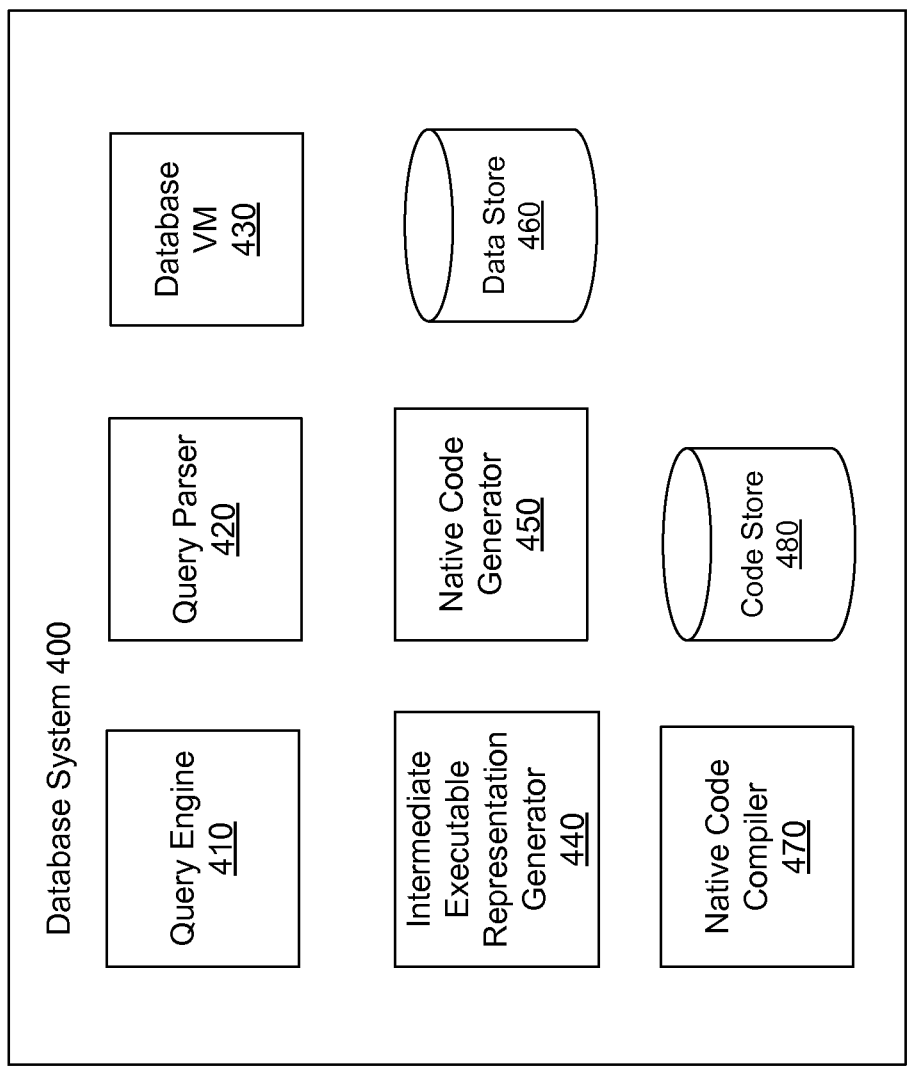
FIG. 4 illustrates the system architecture comprising various software modules for efficiently executing database queries on a computing device with a GPU, in accordance with an embodiment of the invention.

FIG. 4 illustrates a system architecture comprising various software modules for efficiently executing database queries on a computing device with a GPU, in accordance with an embodiment of the invention. As used herein, the term "module" refers to a computer program logic and/or data for providing the specified functionality. A module can be implemented in hardware, firmware, and/or software. The components shown in FIG. 4 include a query engine 410, a query parser 420, a database virtual machine (VM) 430, an intermediate executable representation generator 440, a native code generator 450 and a data store 460.

The query engine 410 organizes the overall execution of a database query. The query engine 410 may invoke functions provided by other modules illustrated in FIG. 4. Queries are specified by users or applications using a language that is standard and easier to understand by users or developers, for example, the structured query language (SQL.) However, the representation of a query provided by the user or an application may not be easy for a database system to directly process. Therefore, the query parser 420 parses input database queries to build a representation of the query that is easier to process. The representation of the query built by the query parser 420 identifies the various parts of the query and also allows the query engine 410 to estimate a complexity of the query. For example, the query engine 410 may determine that a complex query is preferably executed on using a CPU rather than a GPU. The query engine 410 also estimates the amount of work being processed by the CPU or the GPU to determine whether a query received should be executed using the CPU or by the GPU.

The query engine 410 generates a plan for executing the query. The intermediate executable representation generator 440 translates an input query to an intermediate executable representation which can be executed using an execution engine, for example, a database virtual machine (VM) 430. The generated intermediate executable representation may be further translated into OpenCL or executable C code. Alternatively, the intermediate executable representation maybe directly executed using the database VM.

The process of generating the intermediate executable representation allows the database system 400 to verify that the input query is a valid query and conforms to the schema of the database. For example, the database system 400 may verify whether all tables, columns, etc, referred in the query exist in the database schema. The process of generation of the intermediate executable representation further allows the database system 400 determine information related to the input database query, for example, information describing the data that the query will process or interact with. The database system 400 may also obtain an estimate of the complexity of the query based on the number of columns being processed as well the types of transformation of the data performed for processing the query. The database system 400 may also obtain information describing the size of the input data as well as the size of the output data generated by the database query. The database system 400 may use the information obtained to determine amount of resources used for execution of various parts of the query, for example, the amount of memory allocated for various data structures to avoid resizing of the allocated memory during execution time.

The database system 400 may use the information obtained to determine a target processing unit for executing a portion of the computation for processing the database query. The various portions of computations for processing a database query are also referred to as operators. For example, the processing of a database query may require a sort operator for sorting a set of values, merge operator for merging two or more sets of values, or a scan operator for scanning the elements of a column to perform certain operation using the elements. The processing of a database query may be represented using a set of operators representing various computations performed during the processing of the query. The database system may execute some of the operators using a CPU and some other operators using a GPU.

The target processing unit selected for processing an operator may be determined based on the size and type of the data processed by an operator of the database query. If the size of the data processed by the operator is below a threshold value, the CPU may be preferred for executing the operator. If the size of the data processed by the operator is above a threshold value, the GPU may be preferred for executing the operator.

In an embodiment, the intermediate executable representation generator 440 generates a set of opcodes for executing the input query based on the plan generated for the query. Each opcode is an instruction for execution using the database VM. The database VM 430 interprets the opcodes corresponding to the query. The execution of opcodes for processing the query is optimized for execution using a CPU. The architecture of a database system based on virtual machines allows easy development of the database functionality. For example, a database system developer can easily add new features to the database system by generating appropriate opcodes that are executed by the database VM 430. To simplify the development of database features, the opcodes provide generic functionality. For example, typically opcodes operate on arbitrary column types. As a result, execution of the opcode requires branch statements or branch instructions, for example, "switch" statements or "if" statements that check the type of a column input and perform appropriate actions for each type. As a result, execution of database queries using opcodes on a database VM requires execution of several branch instructions. A CPU typically has a single pipeline of instructions. CPUs minimize the overhead of branch statements in code based on optimizations specific to single pipelines of instructions, for example, using branch prediction. Other embodiments generate programming language code from the intermediate executable representation, for example, C code corresponding to computations performed by the database query. Other embodiments generate optimized OpenCL code from the intermediate executable representation for execution on a processing unit, for example, for execution on one or more GPUs available to the database system 400.

In contrast, the penalty of using branch instructions is severe for GPUs due to a large number of threads executing the same set of instructions (SIMT architecture). The mechanisms used for minimizing the effect of branches on a CPU are inadequate and inapplicable for improving the performance on a GPU due to the differences in the architectures of GPUs and CPUs. As a result, development of code for executing database queries on a virtual machine is convenient and the performance penalty of using a VM is not significant on a CPU. In contrast, on a GPU the execution of opcodes on a virtual machine may result in synchronization across a large number of threads during the execution to ensure that all threads are executing the same set of instructions.

One of the reasons why execution of opcodes is optimized for execution using CPUs is that the use of GPU for general purpose computing is a relatively recent development in technology compared to the use of CPUs. Accordingly, an attempt to execute the opcodes using the GPU results in inefficient execution. Therefore, embodiments generate efficient code for GPUs using a native language. A database system 400 may include one database VM for a GPU and another database VM for a CPU. The opcodes generated for a given query for the two database VMs are same but the two database VMs may execute the opcodes differently depending on the target processing unit.

The native code generator 450 generates native code from opcodes for executing a query. The native code may be specified in a programming language, for example, C. The native code compiler 470 compiles the native code generated for the query to executable code that can be directly executed by a GPU. The generated code including opcodes, native code, or executable code is stored in the code store 480. The ability to generate native code from opcodes allows the database system 400 to optimize execution of the opcodes in a global fashion such that efficient code is generated for a set of opcodes rather that for each individual opcode. The efficient code generated by the native code generator is optimized such that it does not require execution of conditional statements such as "if" statements or "switch" statements that would be executed by the opcodes if directly executed using the database VM 430. Since a very large number of branches in the execution of opcodes are checking types of data native code generator 450 provides significant improvements in the performance of generated native code by analyzing the database schema to determine the data types of values processed by a query and generating appropriate code for specific data types. As a result, the overhead of checking the types of values is incurred at compile time by the native code generator 450 rather than incurring the overhead at run time, for example, as incurred by the opcode based execution. Applying these optimizations for a CPU based execution are unlikely to result in significant advantage over an execution based on opcodes since CPUs optimize branch statements using branch prediction techniques.

The native code generator 450 performs optimizations to improve the efficiency of the generated native code. In an embodiment, the native code generator 450 analyzes the opcodes corresponding to the query to determine if certain operations, for example, branch operations can be eliminated in the generated native code. For example, several queries that process column information generate opcodes that check the type of the column and take appropriate actions based on the type of the column. These opcodes are designed to process arbitrary types. Typically the opcodes take as inputs general purpose registers that correspond to columns processed by the opcodes. However the checking of the types of columns is an operation that results in inefficient execution of the query on a GPU. The native code generator 450 eliminates these checks of the types of columns by determining the type of the column by analyzing the query and using information available in the database metadata. Accordingly, the native code generator 450 generates native code that is specific to a type of column without requiring a check of the type of the column. As a result, the native code generated by the native code generator 450 eliminates several "if" statements and "switch" statements that check the type of the columns from the corresponding code based on opcodes. Typical opcodes generated for queries may perform the type check hundreds of thousands of times or even millions of times. Since the penalty of executing branch instructions such as "if" and "switch" statements in a GPU is high, this provides significant performance improvement.

In one embodiment the native code generator introduces a dummy instruction, for example, a no-op instruction to ensure that two branches of a conditional execution take the same number of unit time for execution. The dummy instruction consumes processing cycles without performing any actual operation. As an example, the native code generator 450 identifies a conditional branch statement in which the execution of instructions on one branch takes more units of time than execution of instructions on the other branch of the code. The unit of time may be cycles of processing unit, for example, CPU cycles. The native code generator 450 introduces one or more instructions that do not perform any operation in the branch of code that is expected to complete execution early to make sure that both branches take the same number of unit time for execution. The native code generator 450 may determine the number of no-op instructions added to a branch of a conditional branch statement so as to cause the execution of both branches (or all branches) to take the same number of units of time for execution. This optimization avoids the need for synchronization at the end of conditional statements if the branches of the conditional statement take different number of cycles or units of time for execution.

In an embodiment, a portion of the computation of a query is performed using the GPU and another portion of the computation is performed using the CPU. For example, if the query is "SELECT col1, SUM(col2) FROM table WHERE col2>50 GROUP BY col1," the GPU performs the step of filtering out all rows for which col2 is greater than 50. Subsequently, the CPU performs the summation and grouping of the data returned. Accordingly, the CPU may be preferred for performing the grouping/summation operations but the GPU is preferred for a portion of the computation that performs the same computation on all elements of a column.

The following is an example set of opcodes generated from a sample database query. The input database query is "SELECT col0 FROM TABLE WHERE col0>50." The database query selects value of column col0 from the table for all elements of the column where the value is greater than 50. An example set of opcodes generated from this query is as follows. Each thread of execution executes the opcodes for processing the database query. The first column is a row identifier, the second column is the opcode, the third, fourth, and fifth columns are the values of registers.

| 1 | op_result column | 0 | 0 | 0 | 0 |
| 2 | row parallel | 0 | 0 | 9 | 0 |
| 3 | column | 0 | 1 | 0 | 0 |
| 4 | integer | 1 | 50 | 0 | 0 |
| 5 | gt | 1 | 0 | 6 | 1 |
| 6 | invalid | 0 | 0 | 0 | 0 |
| 7 | result | 0 | 1 | 0 | 0 |
| 8 | converge | 0 | 0 | 0 | 0 |
| 9 | row parallel | 0 | 0 | 0 | 0 |
| 10 | finish | 0 | 0 | 0 | 0 |

The instruction 1 sets up the results by writing to memory space. The instruction 5 ("gt") compares the value of the column read with constant 50. If the comparison evaluates to the value false, the instruction 6 is executed, i.e., the "invalid" operator. However, if the comparison evaluates to true for a particular row, the "invalid" operator is skipped and the next instruction executed. As a result, threads that process data for which the comparison evaluates to true execute a different set of instructions compared to threads for which the comparison evaluates to false. This requires an expensive step that performs synchronization across all threads to ensure that all threads perform the same instructions after the comparison step is done. Similar synchronization may be required for other flow operations that perform loops, jumps, or conditional operations.

The native code generator 450 generates the following C code for executing the opcodes shown above. The following code receives a value in the variable val using the valAtRowCol function and compares the received value with the constant 50. If the value read is determined to be greater than 50, the value stored in variable val is added to the results using the function call addToResults.

```
int val = valAtRowCol(x, y);
if (val > 50) {
    addToResults(val);
}
```

The native code generated aims to eliminate the synchronization overheads that are introduced by the opcodes. The generated C code is compiled to executable code and provided to the GPU for execution. The GPU executes the executable code. The generated code is more efficient for execution on the GPU compared to executing opcodes using a database virtual machine.

The data store 460 stores data, for example, business data. The data may be organized in the form of relations or tables. In an embodiment, the data store 460 stores the tables of the data in a columnar fashion or piecewise columnar fashion. Accordingly, all values of a column are stored together on the persistent storage 360. This allows the database to execute analytic queries efficiently. These queries are optimized for operations that read data stored in the data store 460. However, the embodiments disclosed herein are applicable to other storage schemes of databases, for example, row wise storage of data. For example, if a database performs transactional operations, the data may be preferably stored in row wise fashion. In another embodiment, the database system stores data in a piecewise columnar fashion. This is a trade-off between CPU and GPU access to the same data. For example, storing the data in a columnar fashion favors execution using the GPU, but storing the data as piecewise columnar reduces any penalty suffered by the CPU as a result of columnar storage without significantly affecting the performance of the GPU processing of the data.

If data is stored row wise, an entire row must be retrieved in memory even if a single column is processed by the query. In contrast, with columnar storage, if a database query processes data from a given column, the database system only fetches data from that column. As a result, much less data needs to be retrieved for processing the database query. Execution on a GPU is efficient if the data is organized so that the steps performed for processing the database queries have a uniform execution flow without requiring complex logic with multiple branches. Storing data in columnar fashion allows the database query to retrieve the data and start processing it without requiring significant amount of preprocessing. As a result, embodiments store data in columnar fashion allowing the database system to run analytic queries.

Figure 5:
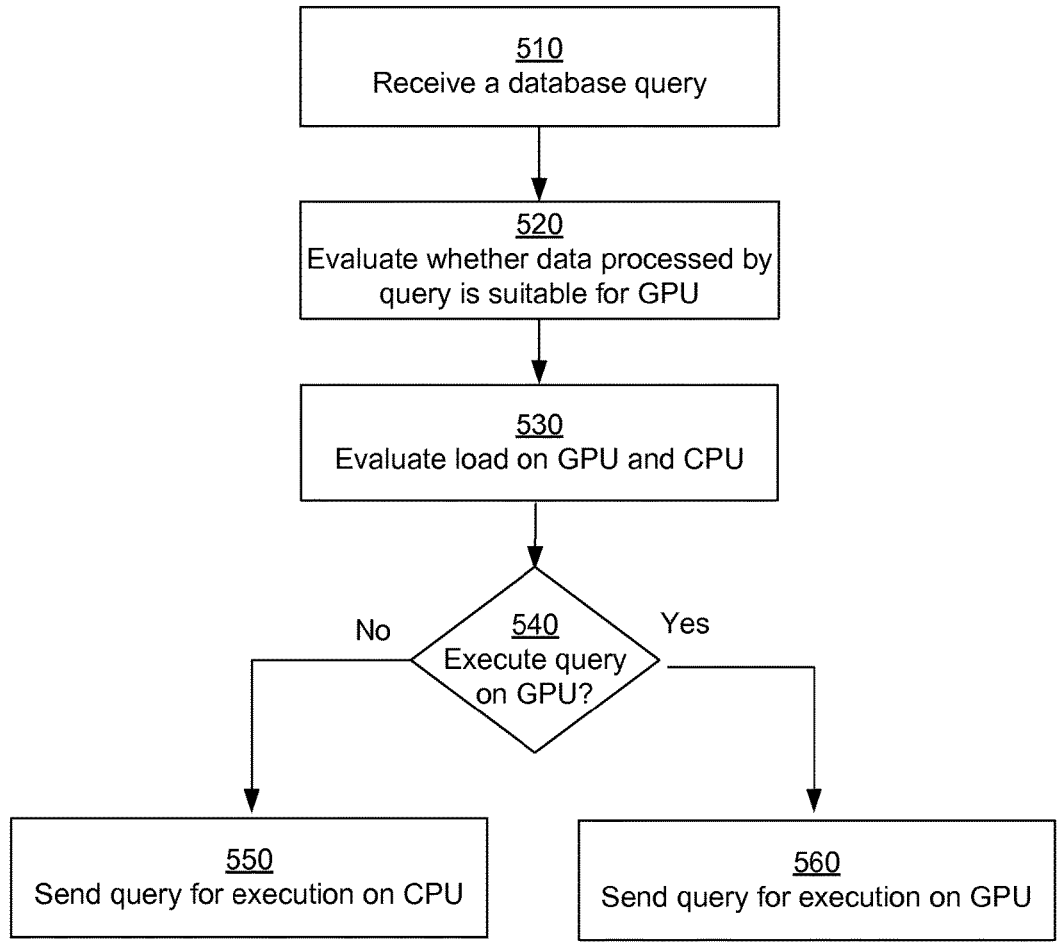
FIG. 5 shows a flowchart illustrating the process used by the query engine of the database system to determine whether to execute a given query on the GPU or the CPU, in accordance with an embodiment of the invention.

FIG. 5 shows a flowchart illustrating a process used by the query engine of the database system to determine whether to execute a given query on the GPU or the CPU, in accordance with an embodiment of the invention. As illustrated in the flowchart shown in FIG. 5, the query engine 410 receives 510 a database query. The database query may be sent by an application, for example, an application running on the same computing device 100 executing the database system 400. However, the database query may also be received from a system that is external to the database system 400, for example, from a remote computing device. The flowchart of FIG. 5 may be considered as illustrating processing of a portion of a database query, for example, a complex database query that requires performs different operations using multiple tables. The query engine 410 may receive a database query and split it into multiple sub-queries or sub-computations, such that the processing of each sub-query or sub-computation is illustrated by the flowchart in FIG. 5. Accordingly, the query engine 410 may process one sub-computation of a database query using a CPU and another sub-computation of the same database query using a GPU. Furthermore, if the computing device has one or more CPUs and GPUs, the query engine 410 may use each GPU and CPU for performing a portion of the computation for the database query.

The query engine 410 evaluates 520 whether the data processed by the query is suitable for execution on the GPU. For example, if the amount of data to be processed is small, i.e., below a threshold value, the query engine executes the query on the CPU. In contrast, if the amount of data to be processed is above a threshold value, the query engine may determine that the query should be executed on the GPU. The query engine 410 also evaluates the type of data being processed to determine whether the query should be processed by the GPU instead of the CPU. For example, if the data being processed includes complex data types, for example binary large objects (BLOBs) or character large objects (CLOBs), the query engine may prefer to execute the query on a CPU. In contrast, if the data being processed comprises simple data types, for example, integers or floating point numbers that have uniform size, the query engine may prefer to execute the query using the GPU. In an embodiment, the query engine 410 determines that a query is executed on a GPU if the query requires sorting. For example, if a query includes an "order by" clause that requires sorting by a column, for example, a string column, the query engine 410 prefers to execute the query on the GPU.

In an embodiment, the complexity of the database query is used to determine whether the database query is executed using the CPU or the GPU. Database queries determined to have complex execution are preferably executed using the CPU instead of the GPU. However, database queries determined to have a simple execution are executed on the GPU. In an embodiment, the query engine 410 determines that a query is executed on a CPU instead of a GPU if the query processes data types that are not word aligned, for example, bits, bytes, and shorts. A data type that is not word aligned (having 4 bytes) is likely to perform poorly on a GPU. In an embodiment, the data types that are not word aligned are stored using extra spaces, for example, by padding the data with extra bytes to align the data on word boundaries. This allows efficient execution of these queries using GPUs at the cost of additional memory space.

If the query engine 410 determines that based on the data processed by the query and the type of the query, the query may be executed on the GPU, the query engine 410 evaluates 530 the load on the CPU and the GPU to determine 540 whether to execute the query on the CPU or GPU. For example, if the GPU is currently available, the query engine 410 executes 560 the query on the GPU. In contrast, if the GPU is busy and/or has other tasks queued up to be processed, the query engine 410 may evaluate the load on the CPU. If the CPU is currently available, the query engine 410 may execute 550 the query on the CPU. However, if the CPU is also busy, the query engine 410 may make a determination 540 based on the load on the CPU and GPU to determine whether to execute the query on the CPU or the GPU. In some embodiments, the query engine 410 may identify various computations performed as part of the processing of the database query, for example, various subqueries of the database query and determine 540 the target processing unit for executing each subquery or computation. For example, a database query may include a first subquery and a second subquery and the query engine 410 may determine 540 that the first subquery is executed by the CPU and the second subquery is executed by the GPU. Alternatively the computation performed as part of processing the database query may be execution of an operator, for example, a scan operator or an operator to sort a column.

Figure 6:
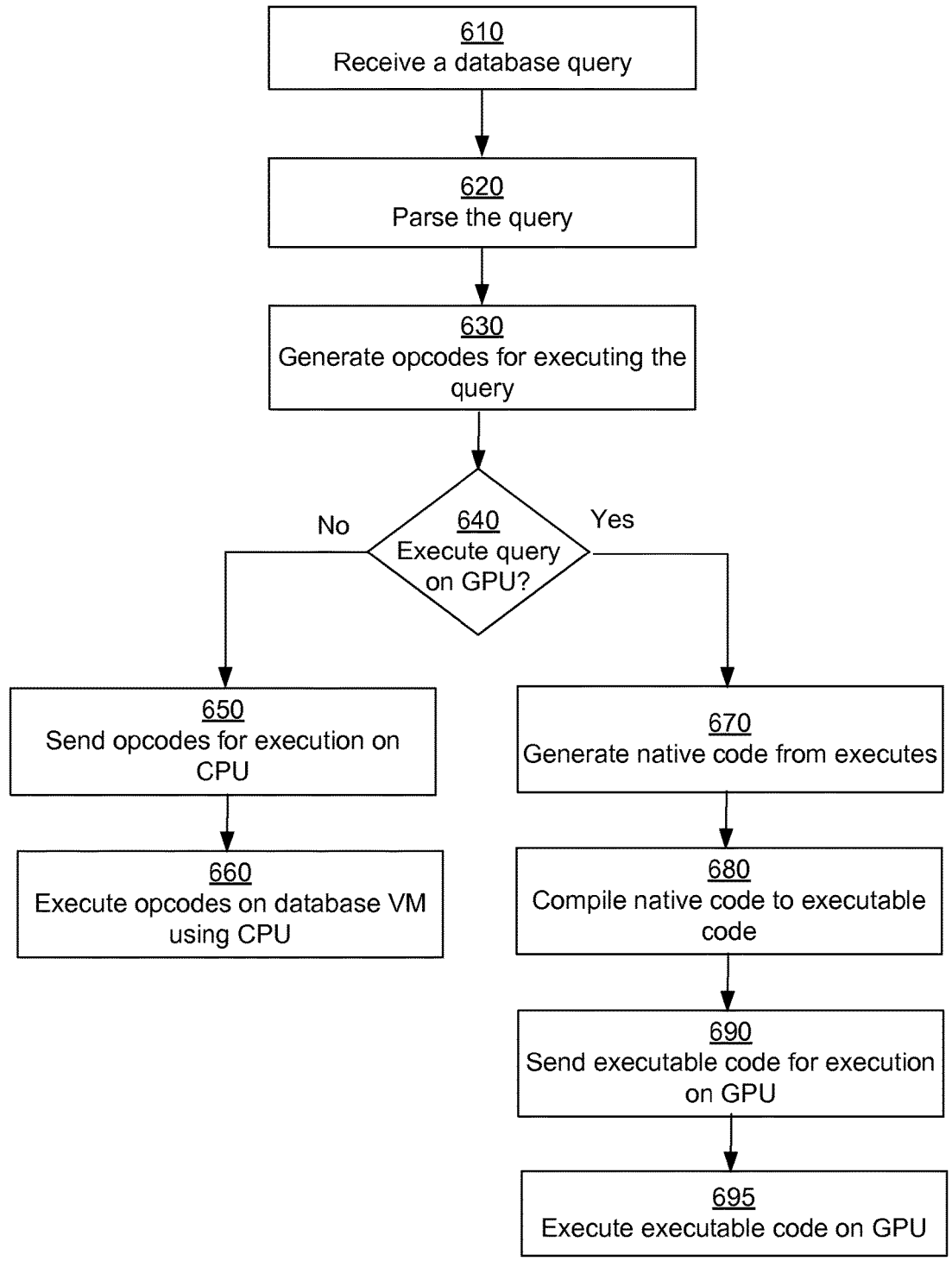
FIG. 6 shows a flowchart illustrating the process for executing a database query using the CPU or the GPU by a query engine, in accordance with an embodiment of the invention.

FIG. 6 shows a flowchart illustrating the process for executing a database query using the CPU or the GPU by a query engine, in accordance with an embodiment of the invention. The query engine 410 receives 610 the database query, for example, from an application. The query parser 420 parses 620 the query and builds a representation of the query for analyzing the query. The intermediate executable representation generator 440 generates 630 opcodes for executing the query using the database VM 430.

The query engine 410 analyzes the database query, the data processed by the query, and the current load on the CPU and the GPU to determine whether the query should be executed on the CPU or the GPU. If the query engine 410 determines 640 that the query should be executed on the GPU, the native code generator 450 generates 650 native code from the opcodes. For example, the native code may be in a language similar to C or a programming language supported by the GPU, for example, OpenCL. The native code may be compiled by the native code generator 450 to executable code for execution on the GPU. The query engine 410 sends 690 the executable code for execution on the GPU. The GPU 320 executes 695 the executable code for the query and provides the result for the query. In some embodiments, the query engine 410 may analyze various computations of the database query, for example, subqueries that form parts of the database query and determine 640 for each subquery or computation whether the subquery or computation is executed on the CPU or the GPU.

If the query engine 410 determines 640 that the query will be executed on the CPU instead of the GPU, the query engine sends 650 the opcodes for execution using the database VM 430 on the CPU. The database VM 430 executes the 660 the opcodes on the CPU to process the query and generate the results of the query. The results of the query, whether executed by the GPU or the CPU, are provided to the requestor. For example, the results may be stored on the data store 460 and/or provided to the application that requested the results.

In an embodiment, the query engine 410 prepares the input data for a query differently, depending on whether the data is expected to be executed on a CPU or a GPU. If the data is expected to be executed on a GPU, the query engine 410 organizes the data in uniform sets that are identical as far as possible. For example, padding bytes may be introduced to make different portions of data have identical size. In contrast, if the database query is expected to be executed using a CPU, the query engine 410 may leave the data as it is for processing by the CPU or may even rearrange it so it occupies smaller space in memory, for example, by packing data.

In an embodiment, the query engine 410 provides the query to both CPU and GPU for execution. For example, the query engine 410 may not have enough details of the query to be able to determine whether the CPU would be more efficient in executing the query or the GPU will be more efficient. Furthermore, the query engine 410 may determine that both CPU and GPU are available for processing the database query. In this situation the query engine 410 sends the query for execution by both CPU and GPU. The query engine 410 receives the results of the execution of the query from the processing unit that finishes the execution first. The query engine 410 may send a request to terminate the execution of the query to the other processing unit, i.e., the processing unit that did not finish first. However, if a query is not a long running query, the advantage of terminating the query is not significant. For example, an application may execute queries that typically take less than few hundred milliseconds and the application may not generate a very large number of queries. For such application, the database system may not have significant advantage by terminating executions of the queries after the result is obtained from one of the execution.

In an embodiment, the query engine 410 starts multiple simultaneous executions of a query using different resources and uses the first result that is available, however, the query engine 410 waits for all executions to complete. The query engine 410 may update the result read from the processing unit that finishes first based on subsequent results if the subsequent results are determined to be more accurate or up-to-date. For example, if the database allows transactions that update, insert or delete data, subsequent results may be more accurate and based on up-to-date data.

If the query engine 410 selects the CPU to execute a query, the query engine 410 may process the query by building hash tables, for example, by using hashing. For example, a query may use hash join operation. However, if the query engine 410 selects the GPU to execute the same query, the query engine 410 may process the query using a sort operator instead of building hash tables. For example, the query engine may prefer to process a query using sort-merge join. This is so because, processing a query using hash tables is inefficient on GPUs but sorting is efficient on GPUs.

The query engine 410 may execute queries involving strings that cannot be reduced to sorting using the CPU. Similarly, the query engine 410 may execute queries processing any non-word aligned data types using the CPU. In an embodiment, the query engine 410 stores two data sets depending on whether memory is shared between the CPU and GPU. If the GPU and CPU use different memory systems, then the data in the GPU's memory system is organized along word boundaries but the data in the CPU's memory system is represented in a compact fashion. For example, each short integer (having s size of 2 bytes) processed using the GPU is loaded into a separate word, thus wasting half the space of the word. If the CPU and GPU share the same memory then the query engine 410 uses a layout of the data so that compacted data that is not word aligned is stored separately from word aligned data. The compacted data is queried by the CPU, while word aligned data is queried by the GPU. If the same column is processed by the CPU as well as the GPU, for example, by different portions of a query, the column may be stored in two It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for executing database queries, comprising:
   receiving a database query for execution by a database system configured to process the database queries using a first processing unit including one or more central processing units (CPUs) and a second processing unit including one or more single instruction multiple thread (SIMT) based processing units;
   generating, by the database system, an intermediate executable representation comprising operators for processing the database query;
   selecting, by the database system, a target processing unit for executing an operator of the operators;
   determining whether to add padding bytes to input data processed by the database query based on the selected target processing unit;
   responsive to selecting the second processing unit including the one or more SIMT based processing units as the target processing unit for executing the operator:
      adding the padding bytes to the input data of a data type, wherein adding of the padding bytes causing data elements of the data type to have identical size;
      generating native code from the intermediate executable representation;
      compiling the native code to executable code; and
      executing the executable code using the second processing unit; and
   sending a result of the execution of the database query.

2. The method of claim 1, wherein the data elements of the data type are not aligned on word boundaries and adding of the padding bytes causes the data elements of the data type to be aligned on the word boundaries.

3. The method of claim 1, wherein adding of the padding bytes causes the data elements to occupy more memory space compared to the data elements without the padding bytes.

4. The method of claim 1, further comprising:
   responsive to selecting the first processing unit including the one or more CPUs as the target processing unit for executing the operator, rearranging the input data of the data type to store the input data in a compact fashion, the rearranging causing the input data to occupy smaller space.

5. The method of claim 1, wherein selecting the target processing unit for executing the operator comprises, selecting the second processing unit including the one or more SIMT based processing units if the database query is determined to sort records of the result of the execution of the database query.

6. The method of claim 1, wherein selecting the target processing unit for executing the operator comprises selecting the first processing unit including the one or more CPUs if the data type of the input data processed by the database query is determined to be one of: bits, bytes, or shorts.

7. The method of claim 1, wherein responsive to selecting the first processing unit for executing a portion of the database query, rearranging a portion of the input data processed by the database query by packing the input data so as to cause the input data to occupy smaller space in memory.

8. The method of claim 1, further comprising:
   sending the operator to both the first processing unit and the second processing unit; and
   receiving a result of execution of the operator from a processing unit that finishes first.

9. The method of claim 8, further comprising:
   responsive to receiving the result of the execution of the operator from the processing unit that finishes first, terminating execution of the operator on the other processing unit.

10. The method of claim 1, wherein the database query joins two or more database tables, the method further comprising:
    determining a type of join operation used for processing the database query based on a type of the target processing unit selected, comprising:
       determining the type of join operation to be hash join operation if the first processing unit is selected as the target processing unit; and
       determining the type of join operation to be sort-merge join operation if the second processing unit is selected as the target processing unit.

11. A non-transitory computer readable storage medium storing instructions for:
    receiving a database query for execution by a database system configured to process database queries using a first processing unit including one or more central processing units (CPUs) and a second processing unit including one or more single instruction multiple thread (SIMT) based processing units;
    generating, by the database system, an intermediate executable representation comprising operators for processing the database query;
    selecting, by the database system, a target processing unit for executing an operator of the operators;
    determining whether to add padding bytes to input data processed by the database query based on the selected target processing unit;
    responsive to selecting the second processing unit including the one or more SIMT based processing units as the target processing unit for executing the operator:
       adding the padding bytes to the input data of a data type, wherein adding of the padding bytes causing a data elements of the data type to have identical size;
       generating native code from the intermediate executable representation;
       compiling the native code to executable code; and
       executing the executable code using the second processing unit; and
    sending a result of the execution of the database query.

12. The non-transitory computer-readable storage medium of claim 11, wherein the data elements of the data type are not aligned on word boundaries and adding of the padding bytes causes the data elements of the data type to be aligned on the word boundaries.

13. The non-transitory computer-readable storage medium of claim 11, wherein adding of the padding bytes causes the data elements to occupy more memory space compared to the data elements without the padding bytes.

14. The non-transitory computer readable storage medium of claim 11, further storing instructions for:
responsive to selecting the first processing unit including the one or more CPUs as the target processing unit for executing the operator, rearranging the input data of the data type to store the input data in a compact fashion, the rearranging causing the input data to occupy smaller space.

15. The non-transitory computer readable storage medium of claim 11, wherein selecting the target processing unit for executing the operator comprises, selecting the second processing unit including the one or more SIMT based processing units if the database query is determined to sort records of the result of the execution of the database query.

16. A computer-implemented system for processing database queries, the system comprising:
a first processing unit comprising one or more central processing units (CPUs);
a second processing unit comprising one or more single instruction multiple thread (SIMT) based processing units; and
a computer readable non-transitory storage medium storing instructions for:
receiving a database query for execution;
generating an intermediate executable representation comprising operators for processing the database query;
selecting a target processing unit for executing an operator of the operators;
determining whether to add padding bytes to input data processed by the database query based on the selected target processing unit;
responsive to selecting the second processing unit including the one or more SIMT based processing units as the target processing unit for executing the operator:
adding the padding bytes to the input data of a data type, wherein adding of the padding bytes causing a data elements of the data type to have identical size;
generating native code from the intermediate executable representation;
compiling the native code to executable code; and
executing the executable code using the second processing unit; and
sending a result of the execution of the database query.

17. The computer-implemented system of claim 16, wherein the data elements of the data type are not aligned on word boundaries and adding of the padding bytes causes the data elements of the data type to be aligned on the word boundaries.

18. The computer-implemented system of claim 16, wherein adding of the padding bytes causes the data elements to occupy more memory space compared to the data elements without the padding bytes.

19. The computer-implemented system of claim 16, wherein the non-transitory computer readable storage medium further stores instructions for:
responsive to selecting the first processing unit including the one or more CPUs as the target processing unit for executing the operator, rearranging the input data of the data type to store the input data in a compact fashion, the rearranging causing the input data to occupy smaller space.

20. The computer-implemented system of claim 16, wherein selecting the target processing unit for executing the operator comprises, selecting the second processing unit including the one or more SIMT based processing units if the database query is determined to sort records of the result of the execution of the database query.

* * * * *